INVENTOR
JOHN P. TARBOX
ATTORNEY

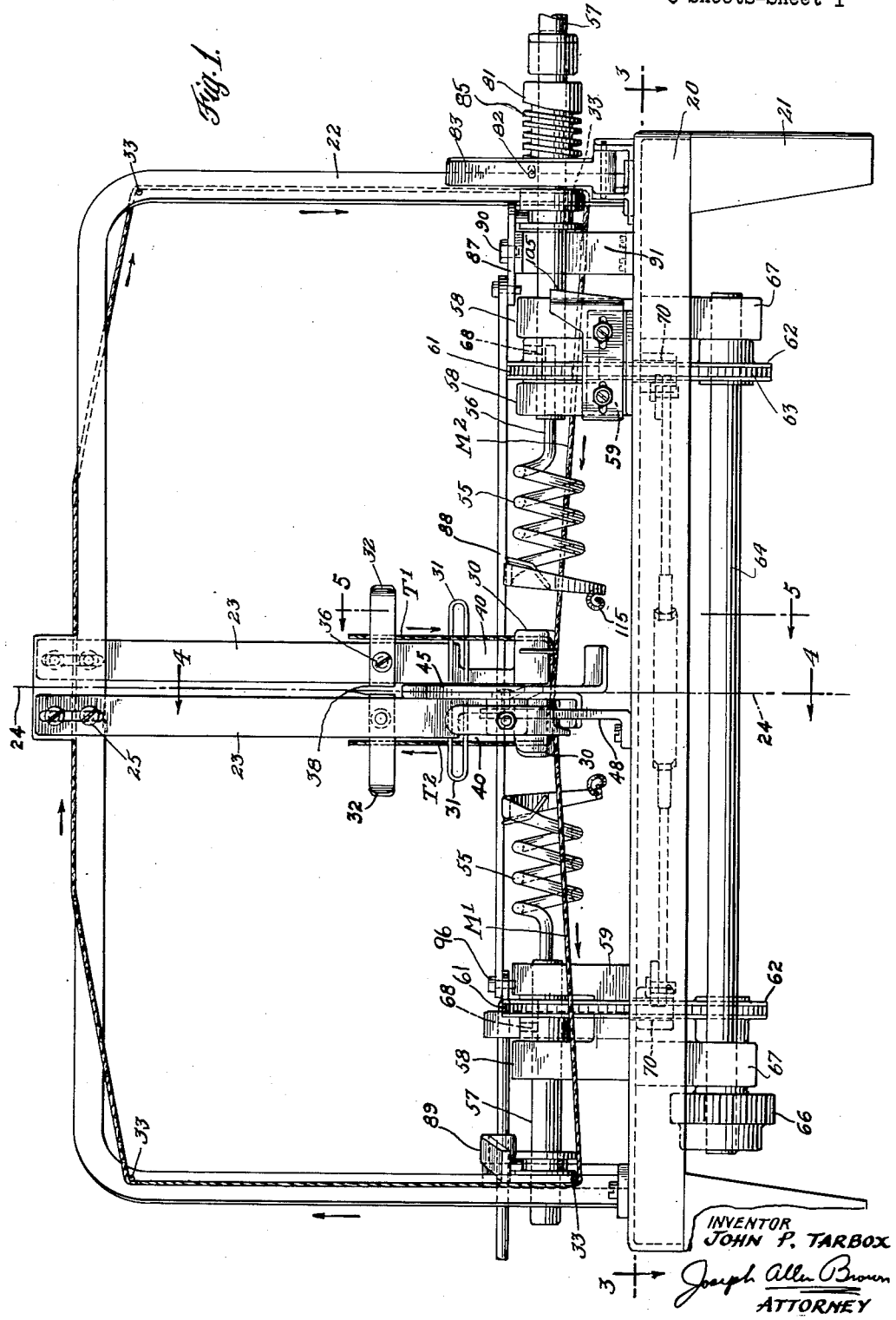

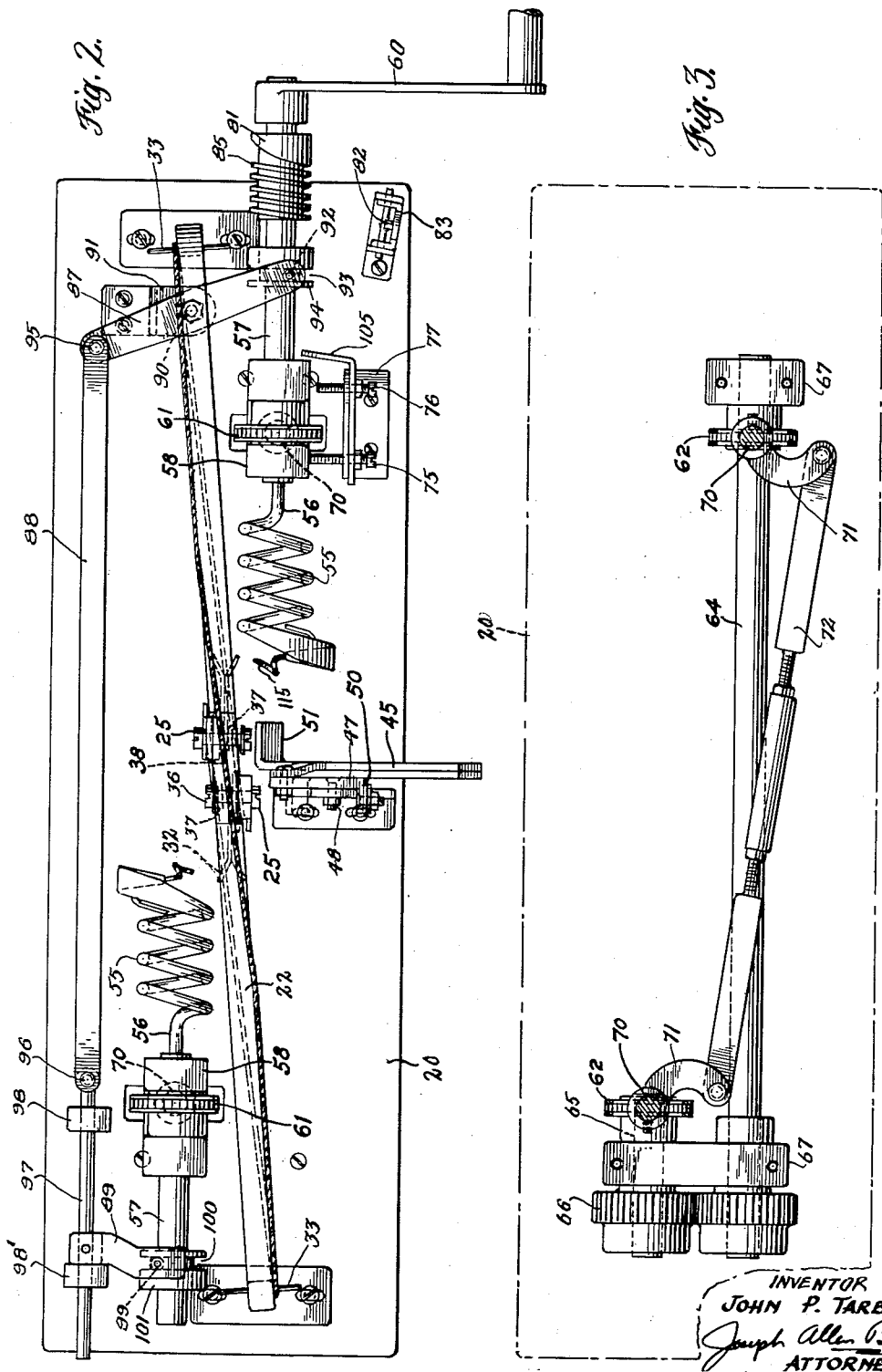

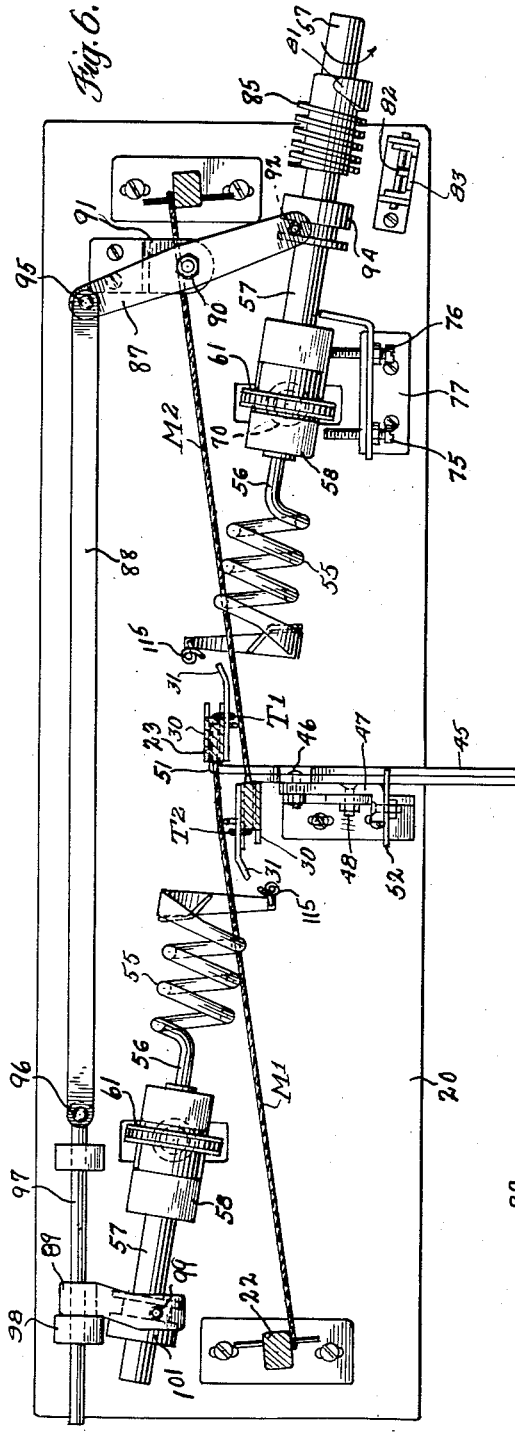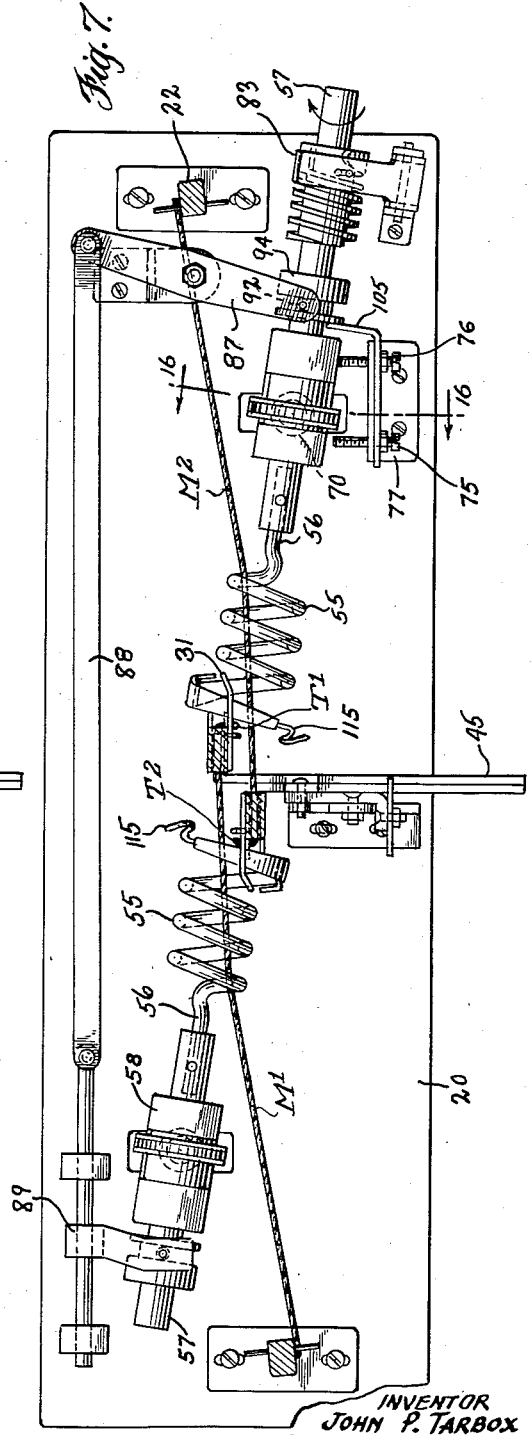

June 6, 1961  J. P. TARBOX  2,987,335
BARREL KNOT TYING MECHANISM
Filed June 3, 1959  6 Sheets-Sheet 5
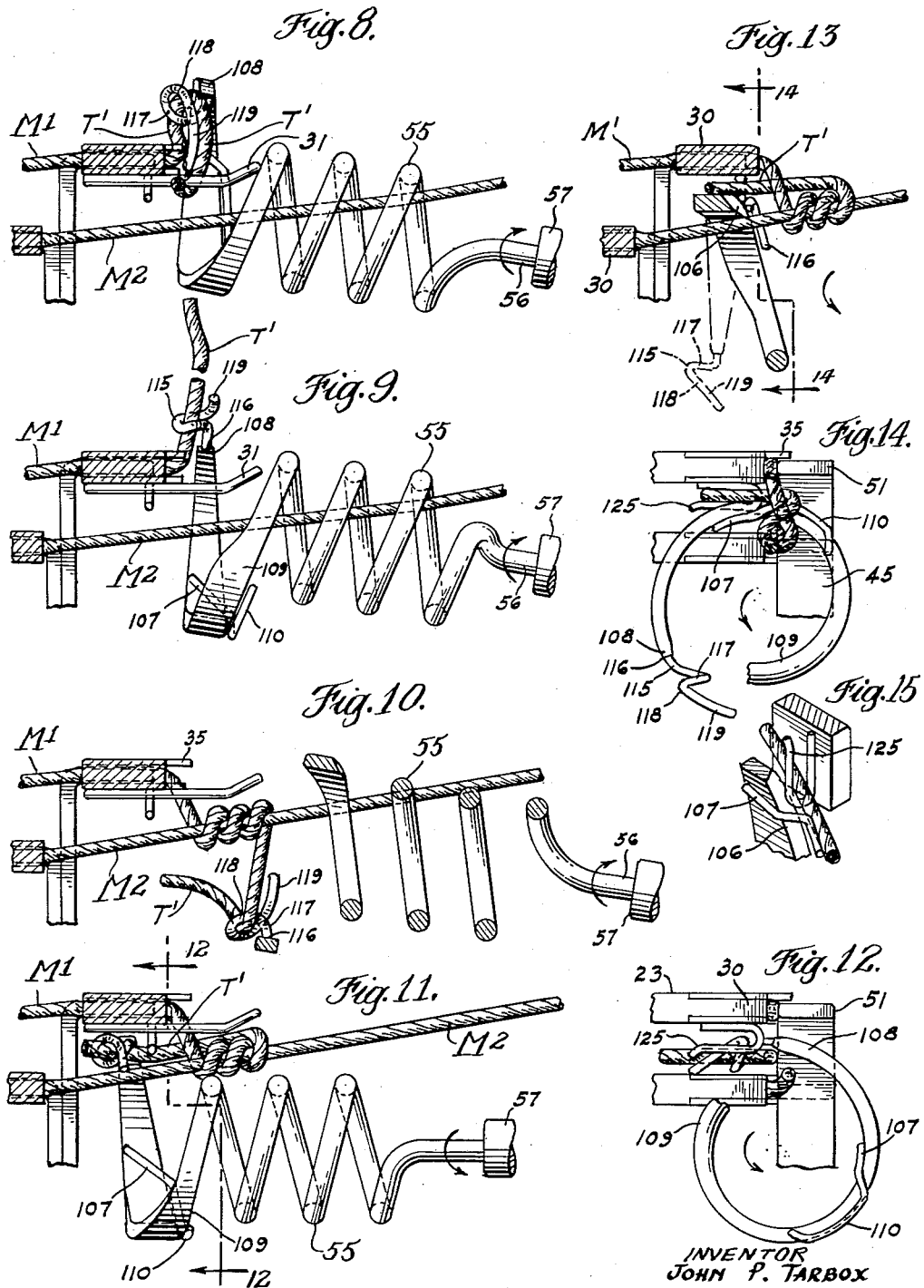
INVENTOR
JOHN P. TARBOX
Joseph Allen Brown
ATTORNEY June 6, 1961  J. P. TARBOX  2,987,335
BARREL KNOT TYING MECHANISM
Filed June 3, 1959  6 Sheets-Sheet 6

INVENTOR
JOHN P. TARBOX
Joseph Allen Brown
ATTORNEY

United States Patent Office 2,987,335
Patented June 6, 1961

2,987,335
BARREL KNOT TYING MECHANISM
John P. Tarbox, Philadelphia, Pa., assignor to Sperry Rand Corporation, New Holland, Pa., a corporation of Delaware
Filed June 3, 1959, Ser. No. 817,817
23 Claims. (Cl. 289—2)

This invention is a barrel knot tier. It is intended for ultimate use upon a hay baler. In this field of use, the general practice is to tie the bales with twine as distinguished from wire and the invention is particularly directed to the use of twine. However, certain of its features may be found useful in tying with wire. The machine illustrated and described herein is a manually operated machine which achieves but a single tie and as such is suitable principally for use in tying barrel knots in general of different types and grades of twine for laboratory use. However, as built for actual installation upon a baler the machine will be embodied in a form which will achieve two or three ties about a bale simultaneously and will be entirely automatically operated.

An object, as compared with earlier barrel knot tying machines which I have invented, is simplification. Not only are the moving parts cut down in number, but the weight and size of these parts which are retained have been cut down. These factors spell reduction in cost of manufacture and maintenance.

Another object of importance is the elimination of articulated joints in all parts which have contact with the twine. The advantage of this is that the fouling and resultant malfunctioning of parts by either fibres of the tie material or of material being baled is reduced to a minimum.

Other objects of this invention will be apparent hereinafter from the specification and from the recital in the appended claims.

The objects of this invention are obtained outstandingly through the employment of a wrapping and inserting element in the form of an open ended, spaced turns, helix rotatable in opposite directions about its axis and equipped at the terminus of its open end with a tie engaging and holding eye in the form of a single turn spiral integrally bonded to the terminus in extension thereof. In addition to mounting the helix for rotation in obverse and reverse directions for threading onto and threading off the main strands which are to be tied together, I mount the helix for movement toward and from the main strands and also for axial movement along the main strands. The wrapping and inserting element so constructed and organized can therefore be freely threaded onto the main strand by way of its open end upon being moved toward the main strand. By shifting the helix axially the terminal strand of the mating main strand can be engaged with the strand it is to be tied to, and while holding this terminal strand, threaded off the main strand thus achieving the wrapping of the opposite terminal strand about the one main strand; and, the wrapping being completed, the helix can once more be shifted axially to insert the extremity of the terminal strand which it holds, between overlapping portions of the main strands to complete the knot.

In the drawings:
FIG. 1 is a side elevation of the tier machine;
FIG. 2 is a top plan view of the tier;
FIG. 3 is a bottom view showing certain of the interconnections between the helical wrapping and inserting units;
FIG. 4 is a vertical transverse medial section taken on line 4—4 of FIG. 1, and looking in the direction of the arrows;
FIG. 5 is a view taken on the line 5—5 in FIG. 1 looking in the direction of the arrows and illustrating the first operation of the mechanism subsequent to the laying of the strands in position to be tied, namely, the clamping operation;

FIG. 6 is a top plan view similar to FIG. 2 but with the upper portion of the strand supporting frame work cut away for greater clarity of showing of the operation of the wrapping and inserting units, and showing the units moved toward the main branches of the strands and the initiation of the threading-on operation as achieved through initial rotation;

FIG. 7 is a view similar to FIG. 6 showing the relative positions of the parts at the completion of the threading-on operation, the helical wrapping and inserting unit now surrounding the main branch of each strand, and further showing the initial axial movement of the helix along the main branch to place its engaging and holding eye in position to engage the terminal branch of the opposite main strand which is to be wrapped about the one main strand;

FIG. 8 is an enlarged top plan view of one of the wrapping and inserting units under its initial reverse rotation, and its terminal engaging and holding eye in the act of engaging and holding a terminal strand;

FIG. 9 is a view similar to FIG. 8 in which the rotation of the unit is shown as having progressed to the point at which the terminal eye of the unit has completed its hold upon the terminal branch, a hold which it will maintain until the knot is completed;

FIG. 10 is also a top plan view but this time showing the helix of the wrapping and inserting unit in horizontal cross section, the better to show how the wrapping of the terminal branch about the main strand has been completed and the terminus of the terminal branch is still held by the engaging and holding end of the helix;

FIG. 11 is a view in top plan similar to FIGS. 8 and 9 illustrating the shifting movement of the helix away from the main branch and its axial shifting along the branch to achieve the inserting operation, the extremity of the terminal branch which is held by the engaging and holding end of the helix being shown about to be inserted by being brought up from beneath;

FIG. 12 is a section taken on lines 12—12 of FIG. 11 looking in the direction of the arrows;

Figure 16:
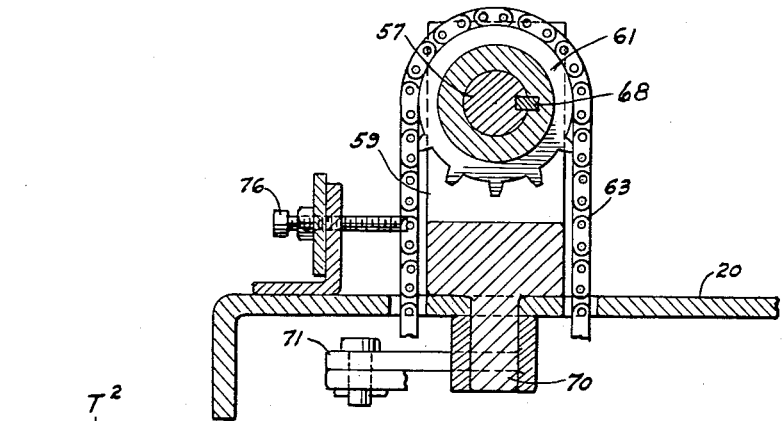
Figure 17:
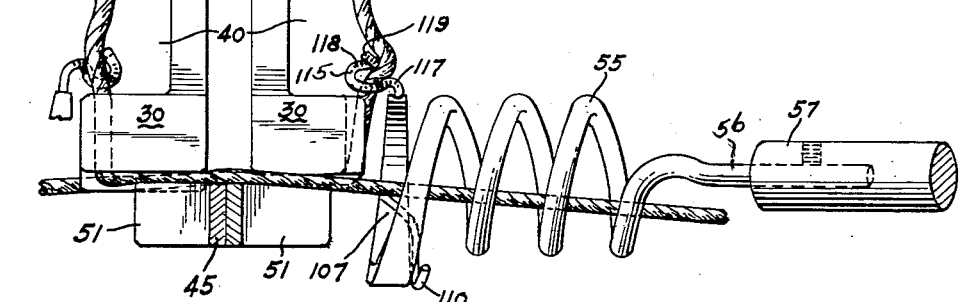
Figure 18:
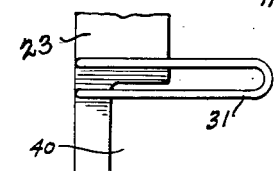

FIG. 13 is also a top plan view in section showing but a portion of the first turn of the helix in full lines but indicating its terminal portion in dotted lines, the dotted lines shown indicating that the engaging and holding terminus of the helix has released its hold upon the extremity of the terminal branch, and the full line showing of the main body of this first turn showing how that main body has raised this extremity between the main strands of the tie thus completing the knot;

FIG. 14 is a section taken on the line 14—14 of FIG. 13 looking in the direction of the arrows and showing the parts in the same relationship but in this case showing the terminal end of the first turn of the helix in full lines throughout;

FIG. 15 is a small perspective view of the parts in the center of FIGS. 13 and 14, to more clearly show the disposition of the extremity of the terminal branch as completely inserted;

FIG. 16 is a transverse section on an enlarged scale taken on lines 16—16 of FIG. 7 and looking in the direction of the arrows;

FIG. 17 is a side elevation of the parts shown in FIG. 8 affording a front side view of the action of the eye of the helix in threading itself; and FIG. 18 is a vertical section of the same parts shown in FIG. 17, but showing the helix revolved through a sufficient angle to complete the threading of the eye.

In FIGS. 1–4, the parts are shown in their normal idle positions and in each of them except FIG. 3, the main strands, the terminal branches of which are to be tied together, are shown as having been laid upon their respective supports and in their respective guides ready to be operated upon.

Referring first to these FIGS. 1–4, the machine is organized upon and about a rectangular base 20 supported by four short legs 21, one at each corner of the base. Upon this base is erected an overhead inverted U-shaped frame 22 extending across substantially the full length of the frame. From the central portion of this frame are depended a pair of vertical strand guiding and supporting members 23. These members 23 are spaced slightly apart from each other longitudinally about a vertical center line 24 and also spaced apart slightly transversely by reason of their mounting upon opposite sides of the bridging frame member 22. They are vertically adjustable relative to the base 20, which their lower ends approach, through the screw and slot attaching means 25 at the upper ends of the members.

These strand guiding and supporting members 23 are each provided with three strand guiding and supporting formations respectively numbered 30, 31 and 32, while the bridging frame 22 is provided at each of its upper corners with strand guiding and supporting pins 33 and also at the lower portion of each vertical branch near the base 20. These supports and guides collectively constitute a means for supporting in L-form the tie portions to be knotted together with their main branches designated respectively $M_1$ and $M_2$ extending away from each other but overlapping to a limited degree at the angles of the L-form, and the terminal branches designated respectively $T_1$ and $T_2$ extended at an angle to the main branches $M_1$ and $M_2$ and in this case substantially at right angles to the main branches.

Figure 5:
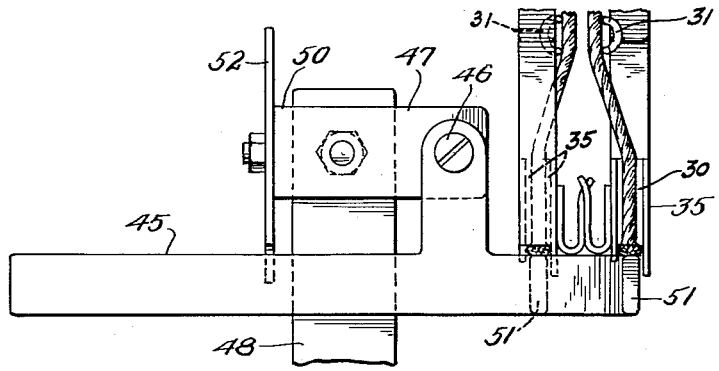

The lowermost guides 30 are comprised of the lower ends of the members 23 to which are welded flat side plates 35 (FIG. 5). These plates are extended downwardly and laterally to form with the lower and outer edges of the members 23 right angular grooves of a width and depth adapted to receive and retain the twine when laid therein under tension. The thickness of the bars or straps which constitute the members 23 is somewhat greater than the diameter of the twine and plates 35 are inset to a slight degree as clearly appears in FIG. 5. Both the edges of the lower end of the members 23 and the corners of the side plates 35 are rounded and smoothed to whatever degree is necessary to prevent catching or cutting of the twine and to insure the smooth passage of the twine thereover.

The intermediate guides 31 are in the form of U-shaped wire loops welded to the outer faces of members 23 and projecting laterally beyond the extremities of the supporting and guiding means 30. The outer ends, that is to say the bights of these guides 31, are flared transversely outwardly (FIGS. 6 and 7) to insure smooth passage of twine thereover.

Figure 4:
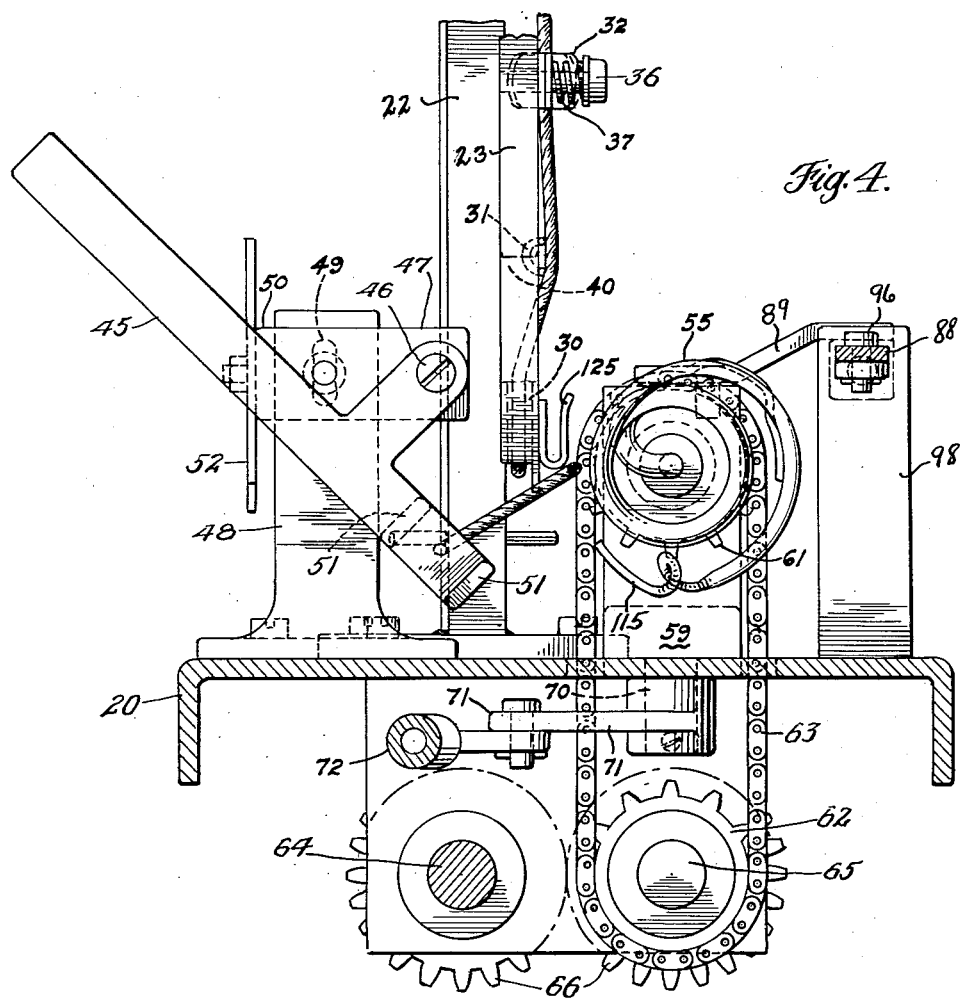

The uppermost guiding and supporting members 32 are bipartite in that each is composed as can most clearly be seen in FIGS. 2 and 4, of two strip metal leaves yieldingly secured together and to the inner faces of the respective members 23 by means of securing and adjusting screws 36 and intervened spiraled springs 37. The inner ends 38 of these members 32 are inturned about the inner edges of the members 23 to insure stability while the outer ends are flared away from each other to enable easy insertion of the twine.

The main bodies of the members 23 in the region between guides 30 and 31 are cutaway as indicated at 40 to permit manipulation of the twine in this region as will appear. Laying of the twine in the L-form is readily accomplished if the procedure indicated by the arrows is followed, first inserting an end $T_1$ of $M_1$ between the portions of the guide 32, where it is held yieldingly by the pressure of the springs 37, thence downwardly in front of guide 31 (FIG. 1), thence around guide 30 and to the left and upwardly and over the bridging frame 22 by way of the guide pins 33, and finally carrying main strand $M_2$ around the left hand lowermost guide 30 and its terminal end $T_2$ past the rear of guide 31, drawing it taut between the leaves 35 of the left hand guide and clamp 32.

Coacting with the lowermost guides 30 is a clamping member 45 as best shown in FIG. 4. Member 45 is in the form of a lever having an offset pivot 46 in a transverse plane upon the transversely extending branch 47 of a vertically extending pillow 48 erected on the base 20 in front of the members 23. (FIG. 1). Extension 47 is bolted to pillow 48 through a slotted connection 49 through which it may be adjusted vertically. Its frontal end 50 is turned sharply inward around the front of the pillow 48 to maintain extension 47 in a horizontal position when adjusted vertically. On its end toward members 23 and the lower guides 30, clamping member 45 is provided with two oppositely extending lateral extensions 51 arranged at radial distances from pivot 46 such that when lever 45 is swung downwardly as shown in FIG. 5 extensions 51 respectively come to bear directly upon the undersides of the angles of the twine in guides 30. Thus the twine can be firmly clamped by these extensions 51 at the guides 30 as pressure is exerted upon the outer end of lever 45. Once the twine is so clamped the lever 45 may be held in this position by means of a provided latch 52 which is pivoted to the inturned end 50 of the extension 47 from pillow 48 in such manner that it may be swung about its pivot to engage a shoulder on its side over the top edge of lever 45 as appears in FIG. 5, to firmly lock the lever in clamping position.

The turn wrapping and end inserting units which co-act with these described supporting and guiding and clamping members are designated 55. They are comprised of open spaced turn helices mounted adjacent to but on opposite sides of the respective main branches to be tied together. That end of the helix lying toward a member 23 is open and has a freely extending extremity which permits the helix to be freely threaded over and about the main branches of the twine. The pitch of the helix and its diameter is such that while being so threaded the twine can freely pass between turns without undue friction, and the cross section of the rod or wire of which the helix is composed is circular and externally smooth to still further make this passage between the turns during a threading-on an easy one. The opposite end of the helix in each case is closed by bringing the endmost turn at that end radially inward substantially to the axis of the helix and then extending it laterally outwardly as at 56 to constitute it a means of journaling the helix for rotation about its axis. In the form shown the extremity of this extension 56 is entered centrally of a journal shaft 57 and secured thereto to be rotated thereby. The shaft in turn is journaled in bearing 58 of a U-shaped pillow 59. The right hand helix 55 has its shaft 57 extended to the right and is there provided with a handle 60 for its rotation. Each of the shafts 57 intermediate the bearings 58 is provided with a sprocket wheel 61 which is slidably splined to the shaft 57 as shown 68 in the detailed cross section of FIG. 16. Sprocket chains 63 connect these sprockets 61 respectively with mating sprocket 62 beneath the base 20 and mounted respectively upon a cross connecting shaft 64 and a stub shaft 65 geared thereto as at 66 (FIG. 3), shafts 64 and 65 being carried in depending bearings 67 secured to the underside of base 20. Through this gearing interconnection when crank 60 is turned, turning the right hand helix 55 about its axis, the left hand helix 55 is rotated correspondingly in the opposite direction.

Besides being rotatively mounted, helices 55 are pivotal about vertical axes for shifting their inner open ends toward and from main branches $M_1$ and $M_2$ of the tie. This is achieved through pivotal mountings 70 of the U- shaped bearing blocks 59 extended vertically downward through the base 20 to a point therebelow. These pivots, as can be clearly seen in FIGS. 2, 3, and 4, are on the line of centers connecting the sprockets 61 and 62 respectively, and they terminate above the axes of sprockets 62 thereby not interfering with the free operation of these sprockets. At their lower ends of pivots 70 are provided with cranks 71 (FIG. 3) extending in the same direction laterally, and these cranks are interconnected by a turnbuckle-link 72. Thereby when the one helix, say the right hand helix 55, is swung about its vertically extending pivotal axis 70, which is substantially at right angles to the axis of rotation of the helix, the free end of the right hand helix will be swung to enter its free extremity under main branch $M_2$, and simultaneously the open free end of helix 55 on the left hand is swung in the opposite direction to enter its free end under the main branch $M_1$. The degree of such angular shifting about the vertically extending pivots 70 being small, the flexibility and a provided slack in the sprocket chains 63 is ample to take care of it without interference with the free operation of the chains and sprockets in achieving the relative rotations. Moreover, mounted upon the top face of base 20 in front of the right hand bearing bracket 59 are a pair of stops 75—76 in the form of set screws threaded into an angular stop bracket 77 by means of which their mounting on the base is secured. Appropriately adjusted, these limit the degree of angular movement of the helices 55 about their vertical axes 70. The left hand set screw 75 (FIG. 2) establishes the normal idle position shown in FIG. 2. The right hand set screw 76 establishes the threading-on and threading-off position shown in FIGS. 6 and 7.

In addition to the means for rotating and the means for laterally shifting which have been described, the sliding key connection 68 (FIG. 1) of the sprockets 61 with shaft 57 of the right hand and grooved cam 81 mounted thereon constitutes a means for shifting the right hand helix 55 axially toward and from the members 23 and their guides. A cam follower pin 82 carried in the mid portion of a lever 83 pivoted to base 20 in the vicinity of cam 81, is swingable about the pivot to be engaged with the cam 81 when shaft 57 is swung to bring bearing block 59 against stop 76. Reaction of cam pin 82 with the cam 81 if crank 60 be turned clockwise will axially move the connected helix 55 to the right and away from the guide 30 nearest to it. Cam groove 81 leads into a regular square thread 85 which is in reality an extension of it and the grooves of this thread are of a size nicely to accommodate pin 82. An initial rapid acceleration of shifting movement by cam groove 81 is thus converted into a regular and more gradual such shifting movement. When cam follower 82 is disengaged from the cam by swinging lever 83 outward, shaft 57 may be manually shifted inwardly to axially move the connected helix 55 towards its adjacent guide 30. Such movements of helix 55 on the right are transmitted in duplicate to helix 55 on the left through a lever and link system 87, 88 and 89. The lever 87 of this system, which system is suitably mounted above the base 20, is pivoted at 90 upon an upstanding bracket 91 for oscillation in a horizontal plane. At its front end it bears a pin 92 which projects into a groove 93 in a collar 94 carried on shaft 57 of the right hand helix 55. At its rear end it connects by pivot 95 with the longitudinally extending link 88. At its left end (FIG. 2) this link connects by pivot 96 with a portion 97 of the link in the form of a rod reciprocable in bearings 98. The member 89 of the link lever system is an arm fixed to rod 97 and projecting forwardly to carry on its forward end a pin 99 bearing in a groove 100 in a collar 101 affixed to shaft 57 of the left hand helix 55. Through this lever link system all axial movements of the helix 55 on the right hand side are transmitted in equal degree to the helix 55 on the left hand side, but as in the instance of the rotation and transaxial shifting, in opposite directions. Arm 89 abutting bearing 98' constitutes a limit stop for shifting movement of helices 55 outwardly away from guides 30 while the inturned end 105 (FIG. 2) of the upright bracket 77 reaches in to abut collar 94 and limit movement of the helices toward the guides 30.

The free ends of the helices 55 are shaped to enable this end of the helix to manipulate the free ends $T^1$ and $T^2$ to effect the knot. The last turn of the helix on this end is specially formed both in its main body and at its terminal end. In the first place it is constituted of a gradually increasing radius which projects its extremity outwardly of the main body of the helix a considerable distance as compared with the diameter of the helix. Secondly, this turn is flattened and widened, especially in its mid section as can most clearly be seen by reference to FIGS. 8–15 of the series depicting the operation. The inner edge of this flattened and widened section is beveled or sharpened as can be seen clearly by reference to FIGS. 13 and 15 to present a sharp pointed entry edge 106 lying toward the main body of the coil and at the interior surface of the widened and flattened turn itself. Thirdly, either at or just beyond the mid-section where the turn is widest, the turn is provided with an internal inclined shoulder 107 whose rather heavy inclination is away from the extremity 108 and toward the inner end 109 of the turn. This shoulder is in the form of a short length of wire welded or brazed to the inner surface of widened section of the turn, and it is extended around the sharpened edge 106, to reach just beyond the outer surface of this flattened turn, to lie close to it and extend a limited distance toward the root 109 of the turn. This extended portion is designated 110. This too can best be seen by reference to FIGS. 8–15. As illustrated this extension 110 is not directly attached to the adjoining edge. Fourthly, the width of this endmost turn at the free end between the shoulder 107 and the extremity 108 is gradually decreased to give the terminal part of the turn a taper approaching a blunted point at the extremity 108. Fifthly, at the extremity 108 there is welded in extension of the spiralling of the turn a strand engaging and holding eye 115 which is itself in the form of a small one-turn spiral. This is rooted at 116 by welding or brazing to the extremity 108 of the turn. The first half turn of the one-turn spiral 117 is given a negative pitch, backwardly of the spiral of the turn of the helix 55 to which it is attached, and extending outwardly of the endmost turn and toward the guide 30, thus constituting it a hook in form. This can best be seen in FIGS. 9, 17 and 18. The remaining half turn which is designated 118 is given a positive pitch forward in the direction in which the extremity 108 points, and the eye is completed by an abrupt increase of forward pitch and terminated in a convexed extension 119 in line with the tapered extremity 108 and having its convex side lying toward the body of the helix 55 (FIG. 8). The eye is preferably formed of stiff wire as is common in the art of thread guiding about machines which use thread and wire.

The two wrapping and inserting units 55 so constituted and having their movements co-ordinated as described, manipulate the twins as supported and guided in L-form as illustrated in FIGS. 1, 2 and 4. FIGS. 1 and 2 show the parts in their idle normal positions in which the helices axes are approximately parallel and substantially in the horizontal plane of the lower edges of the lowermost guides 30, closely adjacent to but on opposite sides of the main branches $M_1$ and $M_2$ which are to be tied together, yet having no part intersecting the vertical plane of the twine loop about the frame 22. In this normal position, the engaging and holding eyes 115 occupy a lowermost position adjacent the top of the base 20 and underlying the axes of the coils of the helices 55. The clamp 45 being locked down and firmly clamping the branches $M_1$ and $M_2$ by their lateral extensions 51 (FIG. 5), an operator first grasps the crank 60 or the shaft 57 of the right hand unit 55 (FIG. 1) and moves the outer end of shaft 57 clockwise (compare FIGS. 2 and 6) until the right hand side of bearing block 59 strikes the stop 76. At the same time crank 60 is rotated as indicated by the arrow in FIG. 6 or counterclockwise thus throwing the strand engaging and holding eyes 115 toward or under the main branches $M_1$ and $M_2$ ready for the threading-on operation as appears in FIG. 6. At this time, as clearly shown in FIGS. 2 and 6 the cam follower lever 83 bears the follower pin 82 in a vertical position and the follower 82 is not in engagement with the cam 81. At this time also the arm 89 of the left hand unit 55 rests against the bearing 98' and fixes the axial shift of the helices 55 at the outward limit.

Following this shifting movement the operator continues to turn the crank 60 thus achieving the threading-on operation by moving the engaging eye 115 about the strands $M_1$ and $M_2$ respectively. In three and one-half turns of such movement (or four and one-half if desired) the helix becomes completely threaded onto the main branch in each case, as illustrated in FIG. 7. Then just as the engaging and holding eye 115 closely approaches or passes the terminal branches $T_1$ and $T_2$ the operator shoves the shaft 57 axially inwardly (using the same hand by which he has been manipulating the crank 60) while retaining bearing block 59 against stop 76, thereby as clearly shown in FIG. 7 bringing the engaging and holding eyes 115 behind the respective terminal branches $T_1$ and $T_2$, in such a position that when the rotation of the helices 55 is reversed, the hook portions 117 of the eyes 115 will hook onto the terminal strands $T_1$ and $T_2$ hook portions 117 of the eyes 115 will hook onto the terminal strands $T_1$ and $T_2$ and carry them with it. This action (as can be seen in FIG. 17) takes place in the region 40 between guides 30 and 31 where the members 23 which mount the guides have been cut away to permit free movement therethrough of the engaging and holding eyes 115. The manner in which the eyes 115 hook onto the terminal branches $T_1$ and $T_2$ is shown in detail in FIGS. 17 and 18. FIG. 18 depicts in plan the relationship between the eye and the terminal branch $T_1$ just after reverse rotation of the right hand helix 55 has been commenced. This reversed rotation is brought about by simply reversing the motion of the crank 60 from a counterclockwise to a clockwise rotation. In FIG. 8, it is to be noted that the reach of branch $T_1$ just beyond the hook portion 117 of the eye incident to the relative movement between extensions 119 and itself, is being slipped over the convex side of the reach 119. In the next few degrees of clockwise rotation as shown in FIGS. 9 and 18 this reach has actually slipped past the convex of the extension 119 and dropped behind it onto the forwardly pitches portion 118 of the one turn spiral eye, thereby becoming completely threaded through it in such a manner that it may continue to hold it in such threaded engagement. This swing into and through eye 115 takes place in the first quarter to one-half turn of clockwise movement and the complex threading through illustrated in FIGS. 9 and 18 is aided in large degree first by the fact that the intermediate guide 30 establishes the rather steep angle between itself and eye 115 as it passes beneath it, secondly by the convexity of the extension 119, thirdly by the fact that the yielding guides 32 permit the terminal branches $T_1$ and $T_2$ to pass therethrough and quickly therefrom, and fourthly by the fact that once the extremities of these terminal branches $T_1$ and $T_2$ are free from the guides 32 the very considerable resiliency of hemp twine results in the twine itself throwing itself in a clockwise direction radially outward thereby to take the position behind and at quite an angle to extension 119. This action is illustrated particularly in FIG. 18.

Just as clockwise rotation is started with the result of the engaging holding and threading through of eye 115 cam follower 82 is engaged with cam 81 in the manner shown in FIG. 7, lever 83 being thrown over to engage pin 82 with cam 81, and when the follower is engaged by the outer portion of the cam, a relatively rapid initial movement of helices 55 away from the guides 30 takes place. This too aids in the completion of the threading through of the eyes 115. Follower 82 is soon after engaged by the screw threaded section 85 of the cam with the result that three and one-half turns or more clockwise the wraps of the terminal branches $T_1$ and $T_2$ about the main branches $M_1$ and $M_2$ are completed as indicated in FIG. 10 while the terminal ends continue to be threaded through the eyes 115 as shown. The uniform pitch of the section 85 has regularized the wrapping of the turns of $T_1$ and $T_2$ about the main strands $M_2$ and $M_1$ respectively, and kept them close upon each other. The dimensions of the eyes 115 are such as to afford adequate drag to effect adequate tightness of wrapping.

At or just before this juncture and while the last turn is yet within being one-quarter completed, cam follower 82 is freed from the cam section 85 by shoving shafts 57 on the right hand side back to the position shown in FIG. 2 to bring the axes of the helices into parallel relationship in which the left hand side of the bearing block 59 on the right bears against the stop 75. As the shifting is stopped or is being stopped shaft 57 on the right is shoved axially inwardly until the collar 94 and 101 beam against right and left faces of the bearing brackets 59. This axial inward movement is greater than that axial inward movement which was permitted by the stop 105 as can clearly be seen by inspection of FIG. 7. This degree of axial movement brings the eyes 115 directly opposite the flanks of the respective guides 30 and within the region of overlap of the main branches $M_1$ and $M_2$ just inside of the wraps which have been completed about their main bodies. Thereupon the operator operates the crank 60 counterclockwise just one-half turn or thereabouts and then reverse, with the result that the extremities of the terminal branches $T_1$ and $T_2$ are inserted between the overlapping main branches $M_1$ and $M_2$ clearly shown in FIGS. 11–15. At the inception of this action as shown in FIG. 11, the eyes 115 move the extremities of the branches $T_1$ and $T_2$ to enter them between the main strands $M_1$ and $M_2$. In this position the bodies of the terminal branches $T_1$ and $T_2$ engage the inner surface of the widened and flattened endmost turn of the spiral. As the reverse fractional turn continues the sharpened edge 106 appearing clearly in FIGS. 13 and 15 moves between the body of the terminal strand $T_1$ and the body of the main strand $M_2$ tending to separate them (and the same takes place between $T_2$ and $M_1$) and when the inclined shoulder 107 reaches the body of $T_1$ (or $T_2$) below the eye it throws that body sharply to the right carrying it under and to the right of the hook 125, whereupon the eye leaves the extremity of the strand and is pushed beyond the hook 125 by the extension 110 of the inclined shoulder 107 and falls deeply within the hook 125 as depicted in FIGS. 13–15. Here again the action is aided by the inherent resiliency in the hemp twine itself. This completes the barrel knot.

Upon its completion obverse rotation of the half turn is had by clockwise movement of crank 60 to withdraw eyes 115 from between strands $M_1$ and $M_2$. Even though eyes 115 are still engaged with the extremities of the terminal branches $T_1$ and $T_2$ as inserted these extremities cannot be withdrawn from their inserted positions for they are held inserted by the hooks 125. Once the eyes 115 are free the axial shift of the helices 55 is reversed to once more bring them angularly to the normal idle position shown in FIG. 1.

With the parts in this position and the knot complete the clamp 45 can be released by unlatching member 52 and the clamp lowered to the position shown in FIG. 4, whereupon one can grasp the top of the twine loop overlying the bridging frame 22 and with a quick upward jerk bring the wraps of the knot tightly together about the inserted ends. When the loop over the top of the frame 22 is cut in the center the tie thus made is ready for testing. In a testing machine the free ends are wrapped around the opposed pulling members and clamped securely.

The wrapping and inserting units, comprised of the helices 55 constituted and organized as described, contain no articulated joints, nor do the supporting and guiding means which establish the L-form of the portions of the tie to be joined together. The nature of the helices is such that the twine is engaged and held and manipulated at all stages with smoothness and ease free of disturbance of the lay of the fibers of which the twine is constituted. These helix units as such may be made of any number of turns depending upon the number of turns it is desired to use in making the barrel knot. My invention is not only adapted for use in a hand operated machine such as illustrated but also adapted for use in automatic machines such for example as that illustrated in my issued patent, No. 2,863,380, granted December 9, 1958. Of course, in the latter case the loop instead of being formed in the hand machine about the bridging frame 22 will be formed about an actual bale of material and the various actuating mechanisms will be organized entirely above the top or along one side of the bale case instead of partly outside and partly inside of a base frame such as 20 used in this embodiment. The various operations of the tier will be achieved by suitable mechanisms.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. A barrel knot tier comprising frame means, means carried by said frame supporting in L-form two tie portions to be knotted together with main branches extending away from each other but overlapping to a limited degree at the angles of the L-form and minor branches constituting the terminal branches of the knot, a pair of spaced helices having a number of turns desired in the knot, said helices being supported by said frame and respectively coextending with the main branches of the L-form and having open ends adjoining the angle of the L-form, means journalling the opposite ends of said helices whereby they may be rotated about their axes, terminal branch engaging and holding means provided on the open ends of the helices, means for transversely shifting the helices toward and from the main branches to enable them to be threaded thereabout by their open ends and thereafter to be threaded off, means for rotating the helices to achieve the threading on and threading off and for shifting the helices axially toward and from the terminal branches of the L-form to position them in engaging juxtaposition and to bring about engagement and holding of the terminal branches by the terminal branch engaging and holding means when the threading onto the main branch is completed, whereby the terminal branches become wrapped about the main branches when the helices are threaded off, and means for further axial shifting of the helices when the threading off is completed to position the terminal branch holding means in the region of the limited overlap of the main branches whereby a partial threading on rotation of the helices may insert the held extremities of the terminal branches between the main branches in the region of their limited overlap and there release them.

2. A barrel knot tier according to claim 1 in which there are provided motion synchronizing interconnections between the helices.

3. A barrel knot tier according to claim 1 in which the means for shifting the helices toward and from the main branches is constituted by pivots for the journals of the helices arranged in planes at right angles to the axes of the helices together with means for moving them about their pivots.

4. A barrel knot tier according to claim 3 in which the pivots are so connected with the frame of the tier as to position the helices with respect to the L-form supporting means, and in their coextending relationship to the main branches.

5. A barrel knot tier according to claim 1 in which there are provided stop means limiting the extent of each of the aforesaid shifting movements of the helices.

6. A barrel knot tier according to claim 1 in which there are provided two sets of stop means for limiting the axial shifting movement of the helices toward and from the terminal branches, one of them operative at one limit of transverse shifting of the helices and one at the other.

7. A barrel knot tier according to claim 1 in which the means for axial shifting in at least one direction is embodied in a cam in timed relationship to the means for rotating the helices.

8. A barrel knot tier according to claim 7 in which said cam controls the axial shifting away from the terminal branch supports and a portion of the cam provides a uniform rate of such shifting whereby the wrapping of the terminal branches about the main branches is rendered uniform.

9. A barrel knot tier according to claim 1 in which there are provided in connection with the supporting means of the L-form in the vicinity of the angle of the supporting means, a means to receive and hold the inserted extremities against withdrawal.

10. A turn wrapping and end inserting unit for a barrel knot tier comprising an open spaced turn helix having a plurality of turns, the number of turns being at least equal to the number of turns desired in a barrel knot, the helix having one end open and provided at its terminus with a strand engaging and holding means, and having at its other end a means journaling it for rotation about its axis.

11. A turn wrapping and end inserting unit for a barrel knot tier according to claim 10 provided with means for pivoting it about an axis at right angles to its axis of rotation.

12. A turn wrapping and end inserting unit for a barrel knot tier according to claim 10 wherein said journaling means comprises means mounting said helix for rotation about its own axis, rotation about an axis at right angles thereto, and for movement longitudinally of its axis.

13. A turn wrapping and end inserting unit for a barrel knot tier according to claim 10 in which the endmost turn at its open end is spirally expanded upon progressively increasing radii.

14. A turn wrapping and end inserting unit for a barrel knot tier according to claim 10 in which the endmost turn at its open end is flattened and widened axially and internally provided with a rearwardly and downwardly inclined shoulder to engage and push a terminal end peripherally and axially.

15. A turn wrapping and end inserting unit for a barrel knot tier according to claim 10 in which the strand engaging and holding means is in the form of a single turn helical eye attached to one end to the terminus of the helix and extending forwardly in extension thereof.

16. A turn wrapping and end inserting unit for a barrel knot tier according to claim 15 in which the first half turn of the said single turn helical eye has a backwardly extending pitch while the remainder has a forwardly extending pitch.

17. A turn wrapping and end inserting unit for a barrel knot tier according to claim 15 in which the first half turn of the single turn helical eye has a backward inclination and pitch extending axially away from the body of the helix and so possessed of a hook shape, while the second half turn has a forward inclination of increasing forward pitch extending toward the main body of the helix and terminates in a forwardly extending prong which is convexed on its side toward the main body of the helix.

18. A turn wrapping and end inserting unit for a barrel knot tier according to claim 14 in which the edge of said widened portion which is on the side toward the main body of the helix is sharpened internally to push under a terminal end being inserted in a knot.

19. A turn wrapping and end inserting unit for a barrel knot tier according to claim 10 in which the means for journalling the helix for rotation about its axis is comprised of a radially inwardly extended last turn of the helix to the axis of the helix and its extension along that axis beyond the body of the helix thereby constituting it a journalling member.

20. A barrel knot tier according to claim 1 in which clamping means is provided in juxtaposition to the overlapping main branches of the L-form and adapted to engage and clamp portions of said main branches to their supports.

21. A barrel knot tier according to claim 20 in which the L-form supporting means embodies strand guiding grooves and the clamping means engages the strands in said grooves.

22. A barrel knot tier according to claim 1 in which there is provided an open space between the support of the main branches and the support of the terminal branches, open toward the open free end of the helix, whereby the strand engaging and holding end of the helix may freely engage and manipulate the terminal branch of the strand.

23. A barrel knot tier according to claim 1 in which a strand guide is mounted on the supporting means between the main branch and terminal branch supporters in position to be engaged by the terminal branch during its initial movement by said engaging and holding helix end.

References Cited in the file of this patent
UNITED STATES PATENTS

| | | |
|---|---|---|
| 1,690,157 | Becker | Nov. 6, 1928 |
| 2,781,213 | Tarbox | Feb. 12, 1957 |